July 4, 1950 W. I. MATTHEWS 2,513,811

DIVERSITY RECEIVING SYSTEM

Filed March 30, 1944 3 Sheets-Sheet 1

INVENTOR.
WALTER I. MATTHEWS.

BY [signature]

ATTORNEY.

July 4, 1950 W. I. MATTHEWS 2,513,811

DIVERSITY RECEIVING SYSTEM

Filed March 30, 1944 3 Sheets-Sheet 2

INVENTOR.
WALTER I. MATTHEWS.
BY [signature]
ATTORNEY.

July 4, 1950 W. I. MATTHEWS 2,513,811

DIVERSITY RECEIVING SYSTEM

Filed March 30, 1944 3 Sheets-Sheet 3

INVENTOR.
WALTER I. MATTHEWS.
BY H. S. Grover
ATTORNEY

Patented July 4, 1950 2,513,811

UNITED STATES PATENT OFFICE 2,513,811

DIVERSITY RECEIVING SYSTEM

Walter I. Matthews, Riverhead, N. Y., assignor to Radio Corporation of America, a corporation of Delaware Application March 30, 1944, Serial No. 528,748

9 Claims. (Cl. 250—20)

This invention relates to diversity receiving systems, and more particularly to that type of radio receiving equipment which makes provision for combining the signal energy derived from different antennae and separately amplified in different radio receiving circuits.

In order to mitigate the effects of fading, which is encountered in radio signals generally, it has been the practice heretofore to make use of as many as three radio receivers each fed by geographically spaced antennae. The output of each receiver is rectified and the different rectified outputs from the several receivers are fed into a common load resistor. The voltage across the common load resistor is called the combined output and this voltage is fed to any suitable utilization device.

I have found that certain economies may be effected in diversity systems if it is not convenient to employ as many as three receiving antennae. In certain adaptations of my invention, it is also possible to reduce the number of complete receiving sets to be used in diversity reception.

Experience has shown that fading elimination is to a large extent produced by combining the output of two receivers. The addition of a third receiver further improves the overall reception to such an extent that the cost of the additional third unit of equipment has heretofore been considered well warranted.

It is an object of my invention to provide circuit arrangements for combining the effects of signal reception at fewer than three antenna stations, while at the same time obtaining a close approximation to the diversity effects of signal pick-up at three geographically spaced points.

It is another object of my invention to provide diversity receiving equipment of simplified design so arranged that when two antennas are used, the signal energy thereby collected may be amplified in two or more receivers and applied concurrently to a common load.

It is another object of my invention to provide receiving equipment suitable for obtaining a close approximation to three-set diversity even though a single antenna array is used, such as that which is shown in my diversity antenna U. S. Patent No. 2,186,422, which issued January 9, 1940.

My invention will now be explained in more detail, reference being made to the accompanying drawings, in which.

Figure 4:
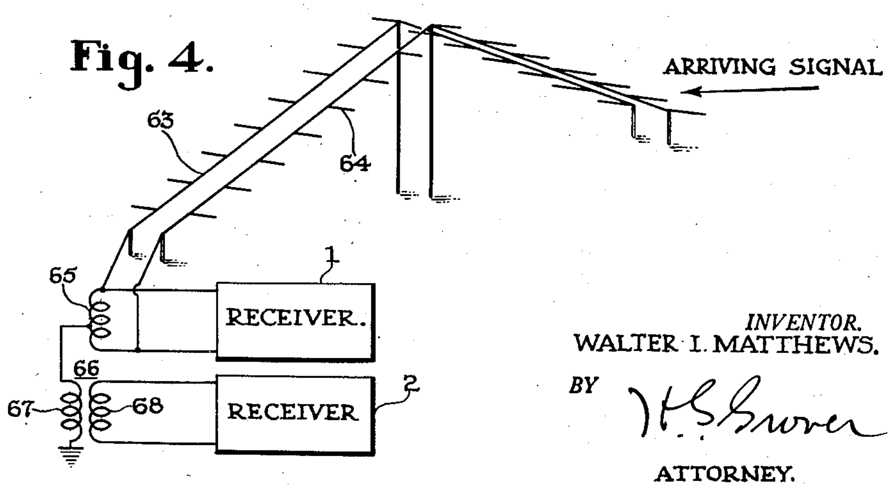
Figure 3:
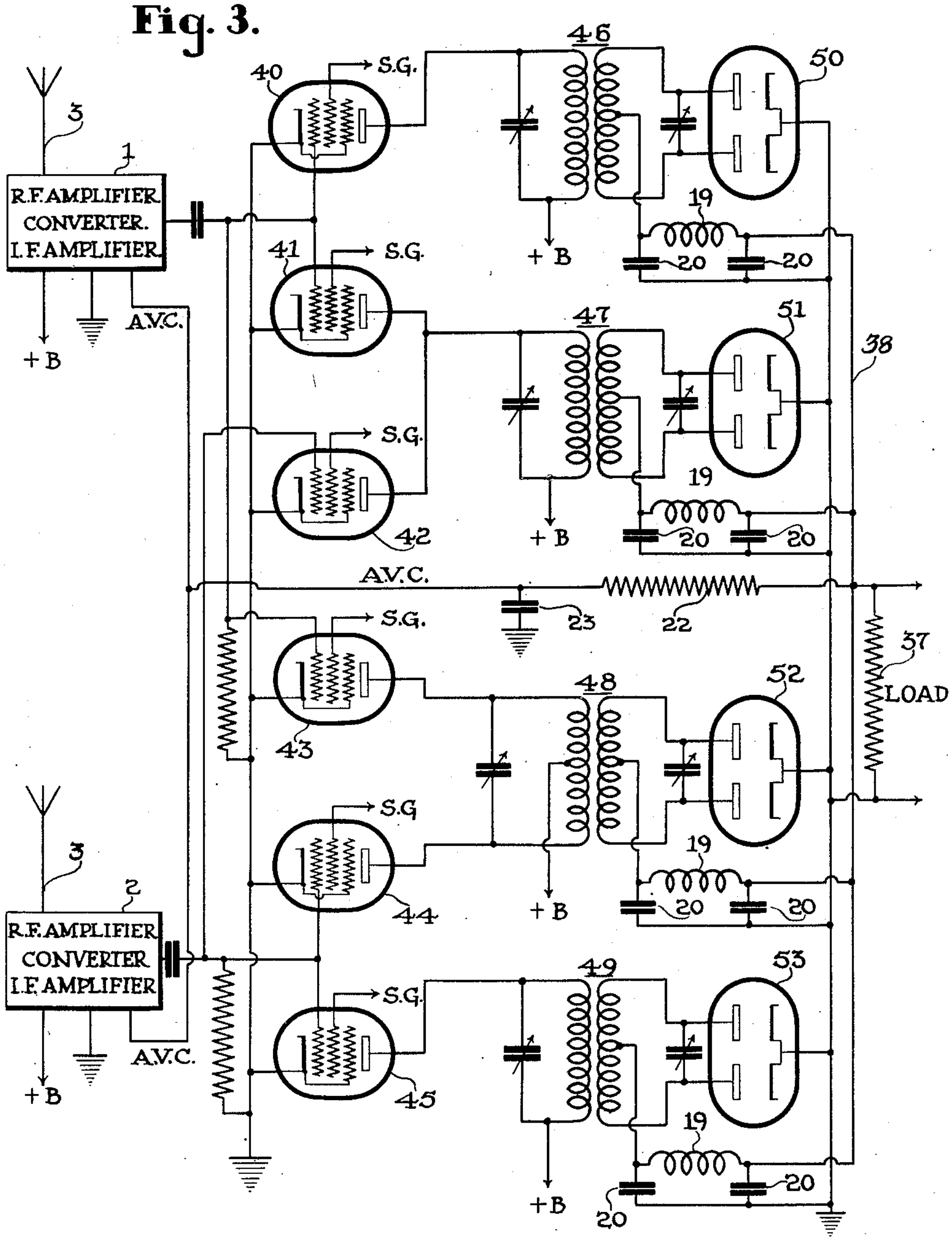

Fig. 3 shows another modification of my invention in which two antennas and two sets of amplifier and converter stages are used and the output from the two sets is combined by the use of as many as four detector circuits; and Fig. 4 shows a system for coupling the input circuits of two receivers to a single antenna array of special type, the object being to obtain the advantages of a diversity receiving system.

Figure 1:
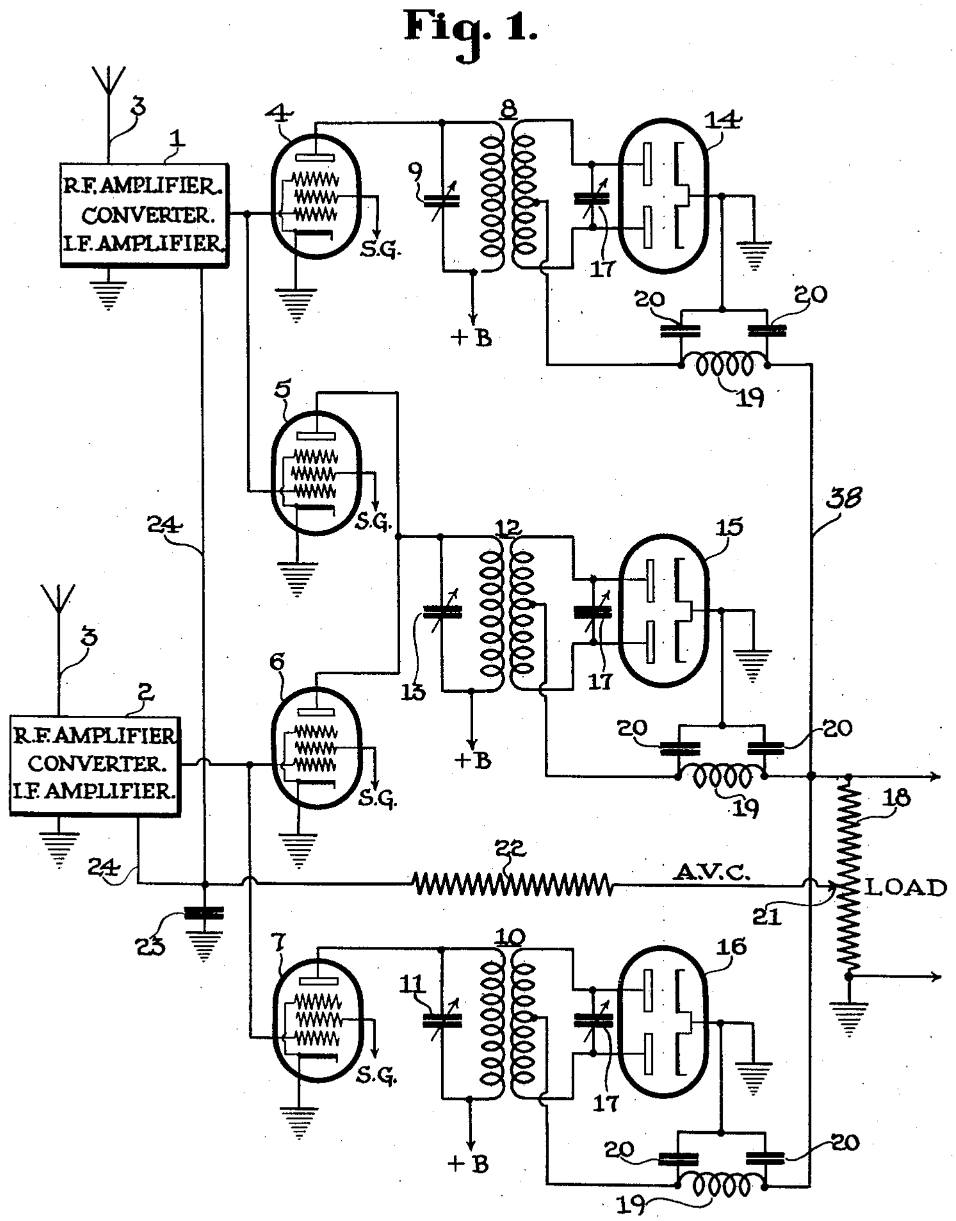
Fig. 1 shows schematically a circuit arrangement including two sets of amplifier and converter stages in a diversity receiving system and arrangements for combining the outputs from these stages through different amplifier and rectifier circuits so as to obtain substantially the effects of a three-set diversity system.

Referring first to Fig. 1, I show therein two signal translating sets 1 and 2, each of which is provided with an antenna 3 and each including a radio frequency amplifier, a converter, and an intermediate frequency amplifier. These translating sets are provided with an automatic gain control device, as will hereinafter be explained.

It is well known that fading effects can be reduced by the use of geographically spaced antennae the signal waves from which are fed into separate receivers. Multipath radiations produce random fading effects which ordinarily are not simultaneous at different antennae. These fading effects are accompanied by random phase relations between the signal waves coming in to a single antenna on two or more paths, and also between the signals collected by different antennae. Phase differences are carried through the receiver circuits up to the final stage of detection of the intermediate frequencies. Therefore, attempts to combine the signals before rectification have usually been unsatisfactory. The operation of combining the signal energies after rectification is, however, entirely satisfactory, since phase differences in the carrier waves are entirely nullified in the rectified output across the load resistor.

The circuit arrangement of Fig. 1 not only provides for combining the rectified output from each of the two translating sets 1 and 2 in a conventional manner, but, additionally, the outputs of these sets are combined before rectification and fed to a third detector which ultimately delivers output energy for combining with the output from the other two detectors. All three detectors feed to the common load.

Translating set 1 has its output circuit connected to the control grids in each of two amplifier tubes 4 and 5. Likewise, translating set 2 has its output connected to the control grids of two amplifier tubes 6 and 7. Tubes 4 to 7 inclusive are preferably of the pentode type, although other types of tubes may be used if desired. The circuits of these tubes are conventionally shown, and it will be understood that for the sake of simplicity in the drawing, I have omitted all showing of the usual bypass condensers and other elements of circuit refinement since the choice of these elements may readily be made by those skilled in the art, and my invention does not depend for its novelty upon any particular choice.

The output circuit of tube 4 includes the primary winding of a transformer 8. This winding is shunted by a tuning capacitor 9. The output circuit of tube 7 is similarly arranged and includes the primary winding of a transformer 10 which is also tuned by means of the adjustable capacitor 11.

The output circuits of tubes 5 and 6 are joined together and have a common interstage coupling transformer 12. The primary winding of this transformer is tuned by means of the adjustable capacitor 13.

Each of the secondaries of transformers 8, 10, and 12 is centertapped in order to provide circuits for full-wave rectification; the terminals of these secondaries are connected respectively to individual anodes in different twin diode rectifier tubes 14, 15, and 16. The common cathodes in all of these tubes are grounded. Each of the secondary windings of transformers 8, 10, and 12 is also tuned by means of adjustable capacitors 17.

A common load resistor 18 is connected at one end to ground and at the other end to a combining circuit conductor 38 which is fed with rectified signal energy from the several centertaps of the secondary windings in transformers 8, 10, and 12. In circuit with these connections, however, I preferably employ high frequency chokes 19, the terminals of which are associated with condensers 20 for bypassing high frequency components to ground.

The terminals of the load resistor 18 may be connected to any utilization device, not shown. A tap 21 on the load resistor provides connection at a suitable point for deriving the desired AVC potentials. These potentials are fed through a time constant circuit consisting of resistor 22 and grounded capacitor 23. The AVC potentials are then applied through conductors 24 to the input circuits within the translating sets 1 and 2.

It will be understood that whenever the phase relation existing between the output voltages in translating sets 1 and 2 is additive in effect, then the combining of output energies from tubes 5 and 6 will produce a considerable addition to the useful output, this addition being derived from full-wave rectification in tube 15. Fading conditions sometimes occur even in the presence of phase agreement between the incoming signals collected by two antennae. In such cases, the output from tube 15 would dominate over that which is derived from tubes 14 and 16, since each of the latter detector tubes is individually fed with energy from a single antenna.

At other times the phase relation between the received high frequencies collected by the two antennae may be in opposition and no advantage will be gained by combining the signals before rectification. During such times, the diversity receiving functions are carried out in the normal manner by amplification of the signals through tubes 4 and 7 and by rectification in tubes 14 and 16. It will thus be seen that the overall effect to be obtained in the operation of my invention as shown and described with reference to Fig. 1 is an equivalent third signal voltage applied to the load resistor at times when the phase relation between the signals as received at the two separate points is favorable. At other times the normal conditions of diversity reception for pick-up at two receiving points are automatically met.

Figure 2:
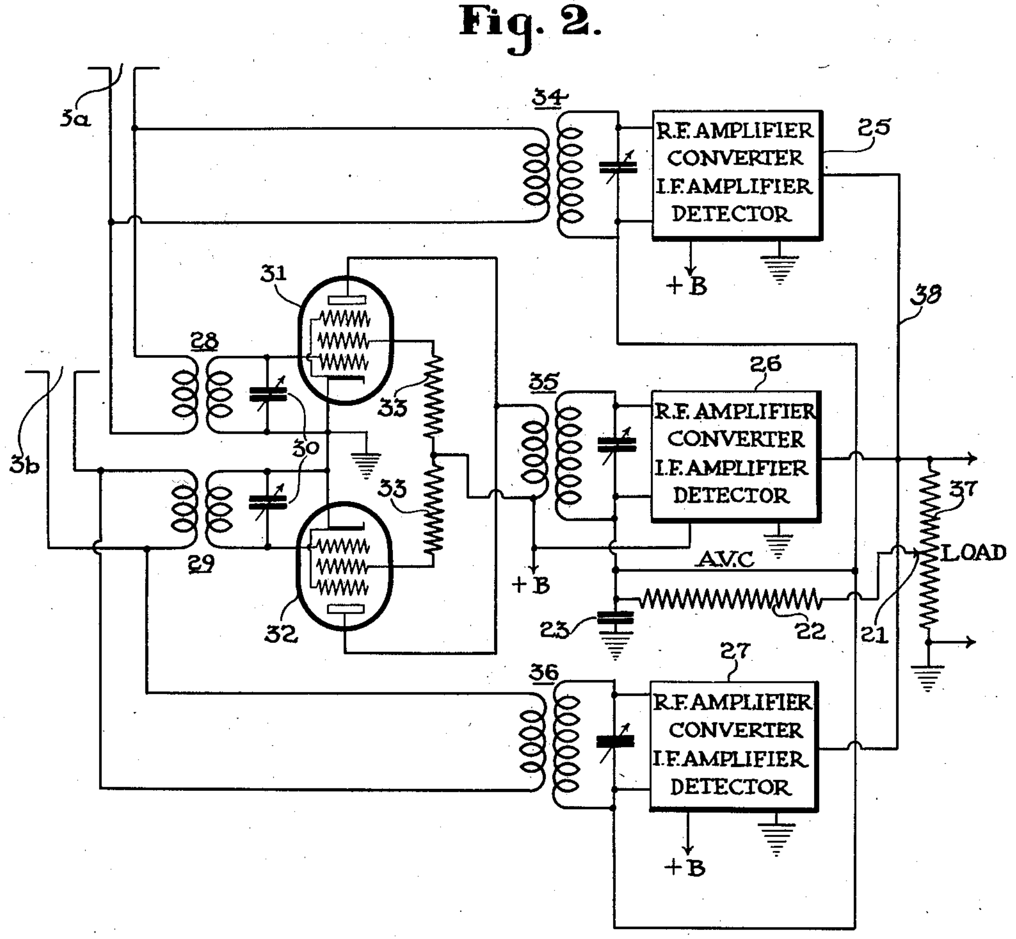
Fig. 2 shows a modification of my invention in which two geographically spaced antennae are used and the energy collected thereby is fed through a novel circuit arrangement designed to combine the separately collected signal energy components in aiding phase relationship.

Referring now to Fig. 2, the modification therein shown is one in which two antennas *3a* and *3b* are provided. In this modification, however, I use three complete radio receiving sets 25, 26, and 27. Receiver 25 is fed with energy from antenna *3a*. Receiver 27 is fed with energy from antenna *3b*. Antenna circuit connections are also made to the receiver 26 through an electronic combining circuit whereby signal energies derived from both antennas *3a* and *3b* are utilized. The combining circuit includes radio frequency transformers 28 and 29. The primary coils of these transformers are connected respectively to antenna *3a* and antenna *3b*. The secondaries of transformers 28 and 29 are tuned by means of adjustable capacitors 30.

An amplifier tube 31 has its control grid connected to one terminal of the secondary of transformer 28. Likewise, another amplifier tube 32 has its control grid connected to one terminal of the secondary of transformer 29.

Tubes 31 and 32 are preferably pentodes, although other types of amplifier tubes may be used if desired. Screen grid potentials are derived from the usual direct current operating source and fed through voltage dropping resistors 33.

Each of the receivers 25, 26, and 27 is provided with an input circuit which preferably includes the tuned secondary winding of a coupling transformer. These transformers are indicated for the respective receivers at 34, 35, and 36. Transformer 34 couples antenna *3a* to the input circuit of receiver 25. Transformer 35 has its primary winding common to the output circuits of tubes 31 and 32. Transformer 36 has its primary winding connected to antenna *3b*.

Each of the receiving sets 25, 26, and 27 is equipped with the usual full-wave detector. Rectified signal potentials derived from these detectors are combined and fed through conductor 38 to the common load 37. The terminals of this load may be used to supply useful energy to any desired utilization device.

Each of the receivers 25, 26, and 27 is preferably equipped with an automatic volume control circuit. The AVC potentials are derived from a tap 21 on the common load and fed through a time constant circuit including resistor 22 and capacitor 23, the same as shown in Fig. 1.

In the operation of the embodiment of my invention shown in Fig. 2, antenna *3a* feeds simultaneously to receiver 25 and to the coupling tube 31. Antenna *3b* likewise feeds simultaneously to receiver 27 and to the coupling tube 32. Since the anodes of the two coupling tubes 31 and 32 are both connected to the primary of transformer 35, it will be understood that receiver 26 is subject to control by both antennas *3a* and *3b*. If the phase relation between the high frequency signals received on the two antennas is favorable, then receiver 26 contributes to a considerable extent in the elimination of fading. When the phase relations are unfavorable for such reception, then either receiver 25 or receiver 27 provides maximum output and this output is used to the exclusion of the output from the other receivers, due to the inherent action of the full-wave rectifiers.

Referring now to Fig. 3, I show still another modification wherein two antennas 3 are used. Each of these antennas delivers its collected energy to one or the other of two translating sets 1 and 2, the same as shown in Fig. 1. The method of utilizing the output from the two sets 1 and 2 is, however, quite different from that which is shown in Fig. 1.

The output from the last stage of intermediate frequency amplification in translating set 1 is coupled to control grids in each of three coupling tubes 40, 41, and 43. The output from the last stage of intermediate frequency amplification in set 2 is likewise connected to control grids in each of three coupling tubes 42, 44, and 45. The purpose of the different tubes 40 to 45 inclusive is to provide combining effects which serve to meet all possible conditions of phase relationship between the high frequency signals derived from the two translating sets 1 and 2. This will be explained in more detail after completing the description of the circuit arrangement.

The output circuit of tube 40 is one which includes the primary winding of a transformer 46. The secondary winding of this transformer is centertapped while its terminals are connected to the anodes of a full-wave rectifier 50.

The anodes in tubes 41 and 42 are interconnected and the combined output signals are fed through the primary winding of transformer 47. Coupling tubes 43 and 44 are arranged for push-pull output, their anodes being connected to opposite terminals of the primary in transformer 48. This primary has a centertap feeding direct current operating potentials to the anodes. Coupling tube 45 functions in the same manner as coupling tube 40, but tube 45 is controlled by output energy from translating set 2 and rectification of this energy is provided in the full-wave rectifier tube 53 which is fed from the secondary of transformer 49.

Each of the rectifier tubes 50 to 53 is of the twin diode type. The common cathodes are grounded. The centertaps on the secondaries of transformer 46 to 49 inclusive are connected to the common load 37 through high frequency chokes 19. By-pass condensers 20 are used to drain off to ground the unwanted high frequency potentials in the detection circuits.

In the operation of the circuit arrangement as shown in Fig. 3, coupling tubes 40 and 45 in association respectively with rectifier tubes 50 and 53 provide conventional diversity reception. Supplementing this, I provide for the combining of signal potentials from the translating sets 1 and 2 when their phase relations are additive, the combining action taking place through coupling tubes 41 and 42. Rectification is provided in the diode tube 51.

I also provide for increasing the useful output from translating sets 1 and 2 when the phase relations between high frequency energies are opposed. In this case, coupling tube 43 is controlled by set 1 and coupling tube 44 is controlled by set 2. Since tubes 43 and 44 operate in push-pull relation, the combined output applied to the rectifier 52 is favorable to the differently phased signals.

Whenever the voltages derived from translating sets 1 and 2 differ less than 90° in phase, they contribute their energies largely through pentode tubes 41 and 42 to the full-wave rectifier 51. Voltages differing more than 90° are added by using the coupling tubes 43 and 44 in push-pull relation so that the output therefrom may be rectified in tube 52.

Fig. 4 shows how my invention may be modified so as to be suitably employed in connection with a single antenna array such as shown in my U. S. Patent No. 2,186,422. The antenna array of the patent is arranged to receive horizontally and vertically polarized radio waves and to distinguish the same by assigning their energies respectively to two independent transmission lines. In Fig. 4, therefore, I show an antenna array 63 having the general shape of a half diamond and having a plurality of dipole arms 64. The two conductors of the transmission line are connected to the terminals of an inductance coil 65. Receiver 1 has its input circuit connected to these terminals. A midtap on the coil 65 is connected to ground through the primary winding 67 of a transformer 66. The secondary winding 68 of this transformer is connected to the input circuit of receiver 2.

As explained in the patent, when the horizontally polarized signals predominate, the end terminals of coil 65 will experience voltages of opposite polarity, thus transferring signal energy to receiver 1, while no difference of potential will exist between the centertap and ground. Therefore, none of the energy due to the horizontally polarized signal waves will appear across the secondary 68 of transformer 66. For vertically polarized waves the end terminals of coil 65 receive voltages of like polarity, thus resulting in no energy transference to receiver 1. These like voltages, however, give rise to a potential difference across the transformer primary 67 and thus result in the transfer of energy to receiver 2.

Since the polarization of the incoming signal wave may assume any angle whatsoever, and since this angle varies from time to time, it follows that the ratio between the horizontal and vertical components of the signal energy is variable in an unpredictable manner. So it will be appreciated that reception by one of the two receivers will dominate over that of the other except when the two components of polarization are substantially equalized; that is, when the axis of polarization assumes an angle of 45° with respect to the axis of the dipole antenna arms. My present invention meets this condition advantageously, and the embodiment shown in Fig. 1 is most efficient in smoothing out the response. Considering the operation of Fig. 1 as applied to Fig. 4, then, as the axis of polarization rotates from horizontal to vertical, the output from translating sets 1 and 2 will be rectified first in tube 14. Then it will be gradually shifted into tube 15, and finally into tube 16. Throughout this rotation of the polarization axis the rectified signal energy will be continuously applied to the common load 18 and to the utilization device.

My invention is, of course, capable of modification in various ways other than as indicated by the illustrative embodiments herein shown and described and without departing from the spirit and scope of the invention itself.

I claim:

1. In a diversity receiving system, two separate antennae, a receiving circuit individual to each antenna, each said receiving circuit including a radio frequency amplifier, a converter and an intermediate frequency amplifier, a pair of discharge devices having input electrodes coupled in parallel to the output terminals of one of said intermediate frequency amplifiers, a second pair of discharge devices having input electrodes likewise coupled in parallel to the output terminals of the other of said intermediate frequency amplifiers, two full-wave rectifiers, a coupling between one full-wave rectifier and one device of one pair of devices, a coupling between the other full-wave rectifier and one device of the other pair of devices, a third full-wave rectifier, coupled to the two remaining discharge devices in parallel, and a common load to which rectified signal potentials from all three rectifiers are fed.

2. In a diversity receiving system, two separate antennae, three receiving sets two of which are individual to each antenna and the third of which is receptive of signal energy derived from both antennae, an electronic combining circuit for translating signal energy from the two antennae to said third receiving set, a detector in each receiving set, and a common load for all three detectors.

3. In a diversity receiving system, two separate antennae, a receiving set individual to each antenna, each receiving set including a radio frequency amplifier, a converter, and an intermediate frequency amplifier, three discharge devices having their input circuits coupled in parallel to the output from one of said intermediate frequency amplifiers, three other discharge devices having their input circuits similarly coupled in parallel to the output from the other of said intermediate frequency amplifiers, four full-wave rectifiers coupled to the output circuits of said discharge devices in a particular manner and arranged to feed their rectification products to a common load, said particular manner of coupling being such that each of two rectifiers derives signal energy exclusively from a respective one of said antennae, a third one of said rectifiers derives signal energies from both antennae when the phase relation between such energies produces an additive effect by push-push action in two certain ones of said discharge devices the output circuits of which are connected in parallel to said third rectifier, and a fourth one of said rectifiers derives signal energies from both antennae when a contraphasal relation between such energies favors push-pull action in another pair of said discharge devices the output circuits of which are opposingly coupled to said fourth rectifier.

4. A diversity receiving system having two receiving channels, two detecting circuits each individual to a respective receiving channel, at least one detecting circuit under joint control of signal energies simultaneously derived from the two receiving channels, and a utilization circuit coupled in common to the outputs of all said detecting circuits in such manner that the strongest signal passing through any of said detecting circuits produces a dominating effect upon said utilization circuit.

5. A diversity receiving system according to claim 4 wherein each of the detecting circuits is coupled respectively to the output of a different receiving circuit possessing stages of radio frequency amplification, conversion and intermediate frequency amplification, and an amplifier stage is coupled to both of said receiving channels ahead of the receiving circuit which feeds signal energies to said one detecting circuit.

6. A diversity receiving system according to claim 4 and including two twin diode detecting circuits to which signal energies are simultaneously applied from both receiving channels, one of said detecting circuits being fed with such energies through a push-push amplifier and the other of said detecting circuits being fed with such energies through a push-pull amplifier.

7. A diversity receiving system having two receiving channels, each including a radio frequency amplifier, a converter and an intermediate frequency amplifier, the output from each I. F. amplifier being connected to the input terminals of a pair of separate amplifier stages, means for separately rectifying the output from one amplifier stage in each pair, means for combining the outputs from the other two amplifier stages of said pairs, means for rectifying said combined outputs, and a common load impedance across which the predominant rectified signal energy is impressed as derived from any one of the three said rectifying means.

8. In a diversity receiving system wherein signal energy is collected by two geographically spaced antennas, a plurality of signal translating sets including means for separately amplifying the energy collected by each antenna, means for first combining and thereafter rectifying energies collected by the two antennas, other means for separately rectifying energy from each respective antenna, and a commonload into which all of the rectified energies are fed.

9. A diversity receiving system as defined in claim 4 wherein each detecting circuit comprises a twin diode electron discharge device and wherein said one detecting circuit under joint control is so connected to both receiving channels that the output thereof produces a dominating effect upon said utilization circuit when the signal energies applied to said one circuit from the two channels are substantially in phase with each other.

WALTER I. MATTHEWS.

REFERENCES CITED

The following references are of record in the file of this patent:

UNITED STATES PATENTS

| Number | Name | Date |
|---|---|---|
| 1,698,014 | Falknor | Jan. 8, 1929 |
| 1,719,845 | Martin | July 9, 1929 |
| 1,874,866 | Beverage | Aug. 30, 1932 |
| 1,904,772 | Taylor | Apr. 18, 1933 |
| 2,364,952 | Crosby | Dec. 12, 1944 |
| 2,448,866 | Crosby | Sept. 7, 1948 |